Patented May 18, 1954

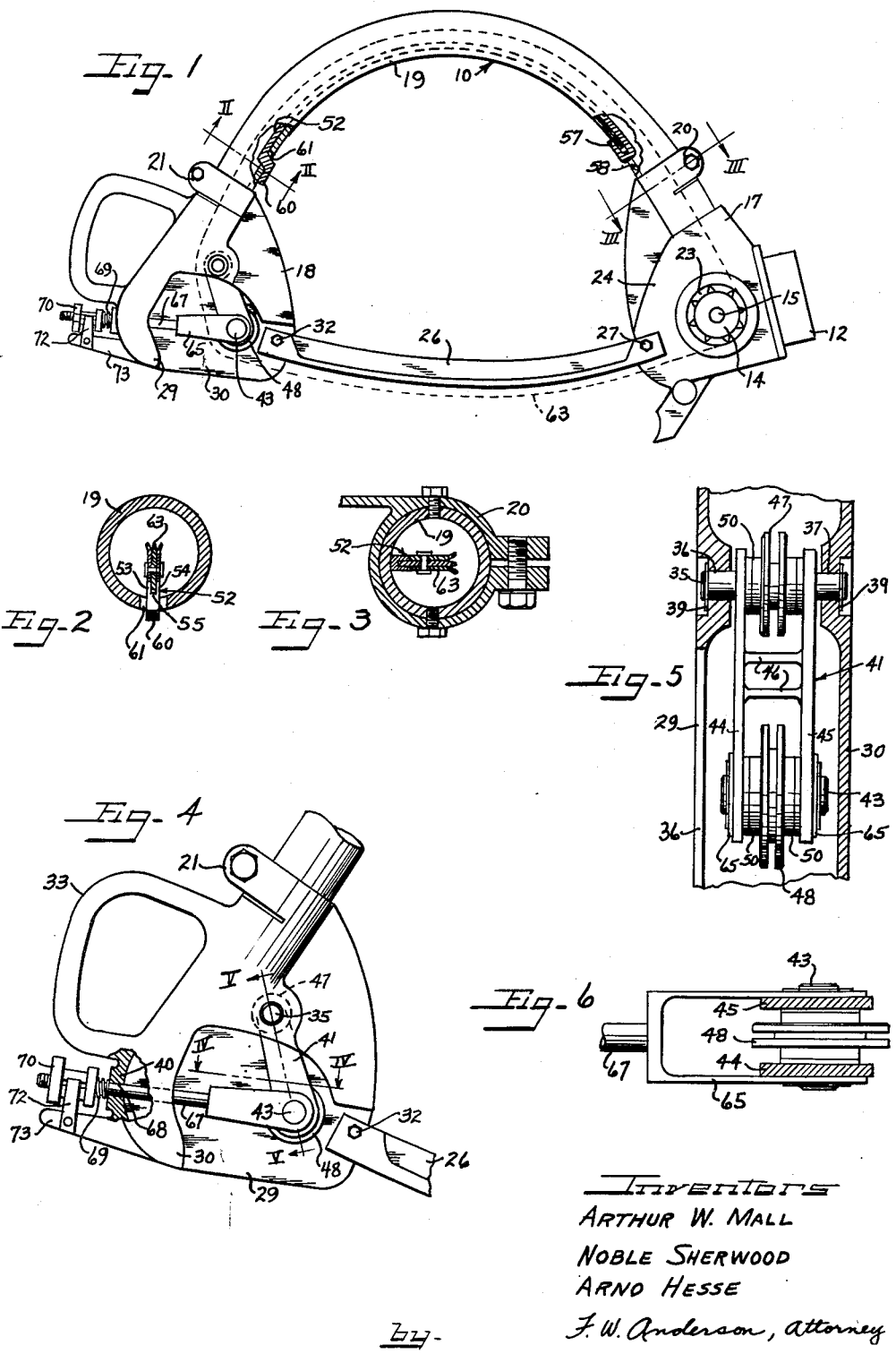

2,678,667

UNITED STATES PATENT OFFICE 2,678,667

PORTABLE BOW SAW

Arthur W. Mall, Flossmoor, Arno Hesse, Chicago, and Noble Sherwood, Crete, Ill., assignors to Mall Tool Company, Chicago, Ill., a corporation of Illinois Application July 22, 1950, Serial No. 175,394

2 Claims. (Cl. 143—32)

The present invention relates to improvements in a power driven bow saw. More particularly it has to do with improvements in apparatus for mounting a cutting chain on a bow saw.

Bow saws have been marketed heretofore that employ a power driven saw chain for cutting. These chains are disposed in rigid mountings that can be adjusted to vary the tension of the chain. Such bow saws enjoy only a limited amount of success due to the fact that the mounting will not yield when the saw chain contacts a knot or a nail in the material being cut or when the movement of the chain is jerky due to pulsating operation of the driving engine and uneven engagement of the sprocket and the chain. This type of rigid mounting therefore results in overstressed links and reduced chain life.

It is, therefore, an important object of the present invention to provide a mounting for the chain of a bow saw that is capable of yieldingly resisting shock loads on the chain.

Another object is to provide a resilient mounting for a chain saw which is arranged to absorb and dampen out shock loads.

According to the teaching of the present invention a saw chain is mounted on the bow saw and is disposed, at one lower corner, over a driving sprocket and, at the other lower corner, over two spaced idler pulleys. One idler pulley is journalled for rotation on a fixed shaft while the second pulley is rotatably mounted at the free end of an arm that is pivotally mounted on the fixed shaft. Since the chain is disposed over the second pulley, swinging movement of the arm and the second pulley will cause variation in the tension of the chain. This swinging movement of the arm is controlled by an adjustable rod that is pivotally connected to the free end of the rod and is spring urged in a direction tending to tension the chain. Thus the spring will hold the chain in tensioned position but will yield when shock loads are encountered.

Other and further features, objects and advantages of the present invention will become evident to one skilled in the art from the following detailed description taken in connection with the accompanying drawings.

On the drawings:

Figure 1 is a side elevational view of a bow saw constructed in accordance with the teaching of the present invention.

Figure 2 is a sectional view taken on line 2—2 of Figure 1.

Figure 3 is a sectional view taken on line 3—3 of Figure 1.

Figure 4 is a fragmentary enlarged side elevational view of a portion of Figure 1.

Figure 5 is a fragmentary sectional view taken on line 5—5 of Figure 4.

Figure 6 is a fragmentary sectional view taken on line 6—6 of Figure 4.

As shown on the drawings:

In Figure 1 the reference numeral 10 indicates generally a bow saw arranged to be driven by a prime mover (not shown) through a clutch or coupling 12. A driven sprocket 14 is keyed to a shaft 15 that is in driven engagement, through a suitable gear mechanism (not shown), with the drive members of the coupling 12. Any suitable coupling and gear mechanism may be used. A preferred arrangement is illustrated in the copending application of Arthur W. Mall and Arno Hesse, U. S. Serial Number 76,143 filed February 12, 1949, now abandoned.

The bow saw 10 comprises a drive housing 17, an idler housing 18 and a tubular bow member 19 which telescopes, at each end, inside the housings. Sleeve clamps 20 and 21, integrally formed on the drive housing 17 and the idler housing 18 respectively, clamp the ends of the bow member 19 to the housings.

The drive housing 17 includes a central hub 23 in which the shaft 15 is journalled and a flat wall member 24 to which one end of a chain guide bar 26 is secured by a bolt 27.

The idler housing 18 has spaced wall members 29 and 30 connected by a transverse wall 40, Figure 4. The other end of the guide bar 26 is secured by a bolt 32 to the wall 29 while a handle 33 is integrally formed on the transverse wall 40. As best seen in Figure 5, a shaft 35 is secured in fixed position in openings 36 and 37 of the opposed walls 29 and 30 respectively. A spring clip 39, at each end of the shaft, prevents axial movement thereof.

A composite lever 41 is pivotally mounted at one end on the shaft 35 and carries, at its free end, a pin 43 which is secured between side plates 44 and 45 of the lever 41. Reinforcing ribs 46 extend between the side plates 44 and 45 to hold them in spaced relation while idler pulleys 47 and 48 are rotatably journalled on the shaft 35 and the pin 43 respectively between the side plates. Spacer washers 50 are disposed on each side of the pulleys 47 and 48.

Referring to Figure 1, it will be seen that an arcuate guide track 52 is disposed inside the tubular bow member 19. The track 52 has upstanding spaced side walls 53 and 54, Figure 2, and a bottom wall 55 connecting the side walls. For the purpose of locking the guide track in the bow, the track is provided with a hooked end 57, Figure 1, that extends through an opening 58 in the tube for engagement with the wall of the tube. The other end of the guide track 52 has an offset tab 60 that extends through an opening 61 in the tubular member. The guide track may be made of a resilient material such as steel and formed with a lesser degree of curvature or bowing than the tubular member. Then, when it is positioned in the tubular member, it is bent to the shape shown in Figure 1 and is firmly held in place by virtue of its normal tendency to return to its unstressed condition.

A saw chain 63, shown in Figure 1 as a dotted line to avoid confusion, is disposed over the drive sprocket 14, in the guide track 52, around the idler pulleys 47 and 48, and the guide track of the guide bar 26. It will be recognized, of course, that, since the guide pulley 48 is mounted on the free end of the swingable composite lever 41, swinging movement of the lever 41 about the shaft 35 is effective to vary the tension of the chain.

Adjustment of the tension of the chain 63 is accomplished by means of a yoke 65, Figure 6, which straddles the side plates 44 and 45 of the lever 41 and is pivotally mounted on the pin 43. The yoke 65 has a threaded shank 67 which passes freely through an opening 68, Figure 4, in the wall 40 and through a coil spring 69 for threaded, adjustable engagement in a nut 70. A spring clip 72, secured to a projecting arm 73 of the housing 18, has a projecting end which engages a slot in the nut 70 to prevent rotation of the nut when the desired adjustment is obtained.

It will be evident that the coil spring 69, acting between the wall 40 and the nut 70, resiliently tensions the chain and provides a yielding mounting for the chain.

From the foregoing description it will be seen that there is provided in this invention a simple efficient manner of mounting a chain on a bow saw. This mouting features a tensioning mechanism that is accessible to the operator for quick adjusting. Further, the tensioning device provides a resilient mounting that will temporarily yield when the chain contacts an obstruction in the wood thus preventing damage to the chain and the bow saw.

It will be understood that modifications and variations may be effected without departing from the scope of the novel concepts of the present invention.

We claim as our invention:

1. In a portable bow saw having a tubular bow member, a drive housing fastened to one end of said bow member, an idler housing fastened to the other end of said bow member, a guide bar extending between said drive housing and said idler housing, and a saw chain riding in said guide bar and through said bow member and trained about a driving sprocket journaled in said driving housing and an idler pulley journaled in said idler housing; a saw chain tensioning device comprising a lever mounted at one end on the shaft of said idler pulley for pivotal movement within the idler housing; a second pulley rotatably mounted on the extended end of said lever; and a lever adjustment mechanism including a rod pivotally connected to the end of said lever carrying said second pulley by means of a yoke straddling the second pulley pinned to the lever, said rod extending through the wall of said idler pulley housing, an adjustable nut carried by said rod, and a spring mounted in fixed relation to the idler housing and bearing against the nut to resiliently tension said rod and thereby urge the second pulley against the saw chain to tension said saw chain in its travel about the idler pulley, the drive sprocket, the guide bar and through the tubular bow.

2. In a portable bow saw having a tubular bow member, a drive housing fastened to one end of said bow member, an idler housing fastened to the other end of said bow member, a guide bar extending between said drive housing and said idler housing, and a saw chain riding in said guide bar and through said bow member and trained about a driving sprocket journaled in said driving housing and an idler pulley journaled in said idler housing; a saw chain tensioning device comprising a lever mounted at one end on the shaft of said idler pulley for pivotal movement within the idler housing; a second pulley rotatably mounted on the extended end of said lever; and a lever adjustment mechanism including a rod pivotally connected to the end of said lever carrying said second pulley by means of a yoke straddling the second pulley pinned to the lever, said rod extending through the wall of said idler pulley housing, means carried by the housing for resiliently urging the second pulley against the saw chain to tension said saw chain in its travel about the idler pulley, the drive sprocket, the guide bar and through the tubular bow.

References Cited in the file of this patent

UNITED STATES PATENTS

| Number | Name | Date |
|---|---|---|
| 170,814 | Carey | Dec. 7, 1875 |
| 973,426 | Harley | Oct. 18, 1910 |
| 1,195,945 | Mitchell et al. | Aug. 22, 1916 |
| 1,562,732 | Arsneau | Nov. 24, 1925 |
| 1,879,145 | Erickson | Sept. 27, 1932 |
| 2,109,702 | Lange | Mar. 1, 1938 |

FOREIGN PATENTS

| Number | Country | Date |
|---|---|---|
| 78,568 | Switzerland | Aug. 1, 1918 |